United States Patent [19]
Srivastava et al.

[11] Patent Number: 6,025,941
[45] Date of Patent: Feb. 15, 2000

[54] STABLE WAVELENGTH DIVISION MULTIPLEX RING NETWORK

[75] Inventors: Atul Kumar Srivastava, Eatontown Township, Monmouth County; James W. Sulhoff, Ocean Township, Monmouth County; Yan Sun, Middletown Township, Monmouth County; John Lehrer Zyskind, Shrewsbury Township, Monmouth County, all of N.J.

[73] Assignee: Lucent Technologies Inc., Murray Hill, N.J.

[21] Appl. No.: 08/929,926

[22] Filed: Sep. 15, 1997

[51] Int. Cl.[7] .......................... H04B 10/20; H04B 10/08; H04J 14/00
[52] U.S. Cl. ........................ 359/119; 359/110; 359/124; 370/222
[58] Field of Search .................................... 359/119, 110, 359/124, 127; 370/222

[56] References Cited

U.S. PATENT DOCUMENTS

| 5,680,235 | 10/1997 | Johansson | 359/110 |
| 5,717,796 | 2/1998 | Clendening | 359/119 |
| 5,870,212 | 2/1999 | Nathan et al. | 359/119 |

*Primary Examiner*—Kinfe-Michael Negash

[57] ABSTRACT

We have recognized that in a Wavelength Division Multiplex (WDM) ring network with a closed loop, the possibility of lasing at Amplified Spontaneous Emissions (ASE) wavelengths exists. In accordance with the present invention, we provide a technique for protecting against lasing in a WDM ring network comprising a plurality of serially connected node links, each node link including a segment of optical fiber and an access node site for adding or dropping one or more active wavelength channels to a transmission bandwidth of the network. The protection means changes the optical transmission characteristics of the transmission bandwidth of the network to ensure that the network loop gain at any wavelength is always less than the network loop loss.

14 Claims, 6 Drawing Sheets

STABLE WAVELENGTH DIVISION MULTIPLEX RING NETWORK

TECHNICAL FIELD OF THE INVENTION

This invention relates to Wavelength Division Multiplex (WDM) ring network and, more particularly, to the prevention of lasing in such WDM ring networks.

BACKGROUND OF THE INVENTION

The growth and diversity of lightwave networks, such as Wavelength Division Multiplexed (WDM) networks are placing new demands on capacity management and provisioning, maintenance, and reliable and robust operation. One type of WDM network is a WDM ring network which may, for example, be used for metropolitan area network applications. The reliability problem in WDM ring networks is particularly significant since the use of closed cyclical paths makes lasing possible if the roundtrip optical gain exceeds the loop loss. The lasing affects signal channels through cross saturation and causes power variations which may reduce system power margins and cause false alarms in system channel monitoring.

A typical WDM optical ring network includes network elements with Wavelength Add/Drop (WAD) capability, whereby some optical channels are dropped and/or added while other channels are expressed, i.e., passed through. Depending on the technology used for WAD elements and the network architecture, closed loops may be formed in the WDM ring network which, with the Erbium-Doped Fiber Amplifiers (EDFA's) used to compensate the losses of network elements and fibers, can constitute ring laser cavities. Laser oscillations in the ring cavity, occurring if the round trip gain experienced by Amplified Spontaneous Emissions (ASE) exceeds the loop loss, may increase amplifier saturation and introduce additional noise, which affect the performance of optical signal transmission. Such effects have been reported by K. Bala and C. A. Brackett, *J. Lightwave Tech.*, 14(1585), 1996 and by J. Iness, et al, *J. Lightwave Tech.*, 14(1207), 1996.

What is needed is a technique for preventing these WDM ring networks from lasing.

SUMMARY OF THE INVENTION

We have recognized that in a Wavelength Division Multiplex (WDM) ring network with a closed loop, the possibility of lasing at Amplified Spontaneous Emissions (ASE) wavelengths exists. We have determined that depending on the structure and operating condition, cross saturation caused by lasing may be a problem. In the worst case, the problem can be so severe that the power of some signal channels be greatly reduced, which will reduce system power margins and cause false alarms, when channel loading in part of the ring is changed even though there is no fault in the ring.

We provide a technique for protecting against lasing in a WDM ring network comprising a plurality of serially connected node links, each node link including a segment of optical fiber and an access node site for adding or dropping one or more active wavelength channels to a transmission bandwidth of the network. In accordance with the present invention, protection means, connected to the network, changes the optical transmission characteristics of the network to ensure that the network loop gain at any wavelength is always less than the network loop loss.

In one embodiment the protection means changes the optical transmission characteristics of an inactive portion of the transmission bandwidth of the network to ensure that the loop gain at that inactive portion is less than the loop loss. In another embodiment, the protection means includes pump and link control. In yet another embodiment, the protection means utilizes access node control algorithms.

DETAILED DESCRIPTION

Figure 1:
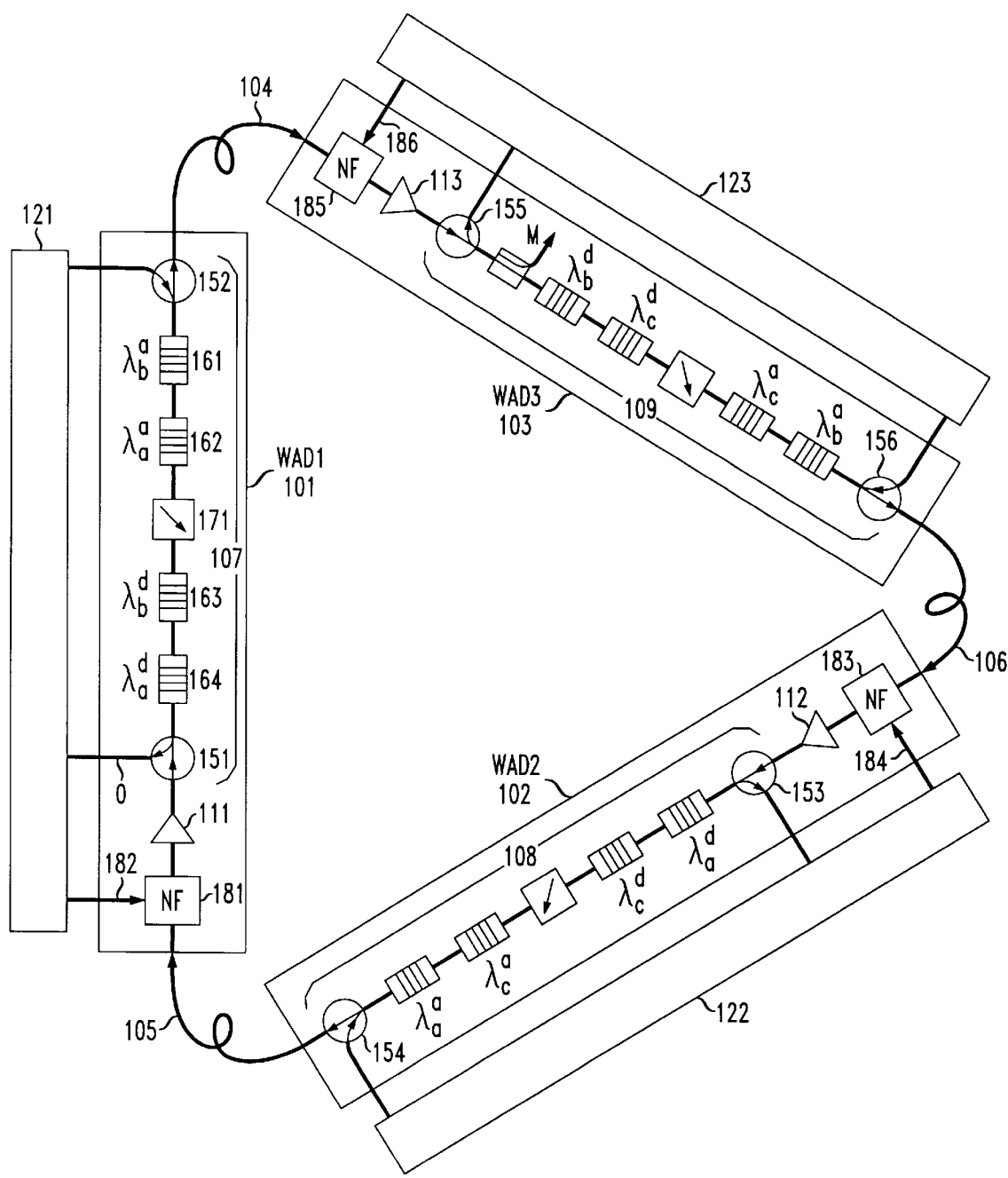
FIG. 1 shows a schematic of an illustrative WDM ring network useful in describing the operation of the present invention.

With reference to FIG. 1, there is shown a schematic of an illustrative WDM ring network, e.g., a metropolitan area network, including three access nodes or sites (e.g., Wavelength Add/Drop (WAD) sites, WAD1–WAD3),101–103, interspersed by three optical fiber spans 104–106. Each node link, e.g., 101/104–103/106, includes an access site, e.g., WAD1–WAD3, and an optical fiber segment, e.g., 104–106, respectively. Each of the WAD1–WAD3 sites, 101–103, is shown to include a WAD element, respectively, 107–109, and an optical amplifier, respectively, 111–113. Each of the WAD elements 107–109 are, illustratively, shown to include fiber gratings and circulators.

Illustratively, the optical amplifiers 111–113 are Erbium-Doped Fiber Amplifiers (EDFAs) which provide optical gain to compensate for the loss in the prior corresponding node link (defined here in as a node and an optical fiber segment). Thus, for example, amplifier 111 would be arranged to compensate for the loss in optical fiber span 104, and the gratings, couplers and fiber connectors of its WAD element 107. In a typical installation each of the node links, e.g., 101/104–103/106 are arranged to have the gain of the amplifier cancel the loss of the fiber and WAD element in its link. As a result, when the node links 101/104–103/106 are serially connected end-to-end into a WDM ring network, if the gain spectrum is flat, the overall loop gain would be zero for any signal wavelength which traverses the WDM ring network. Since in all WDM ring networks no signal wavelength traverses the entire ring network (otherwise the signal wavelength would exit at the same node from which it originated), providing a zero loop gain requirement would appear to be sufficient to prevent lasing in the WDM ring network. We have recognized that while a zero loop gain provides stable operations at the signal wavelengths, it may not prevent lasing at Amplified Stimulated Emissions (ASE) wavelengths of a typical EDFA. Such lasing may severely degrade the performance of the WDM ring network.

Figure 2A:
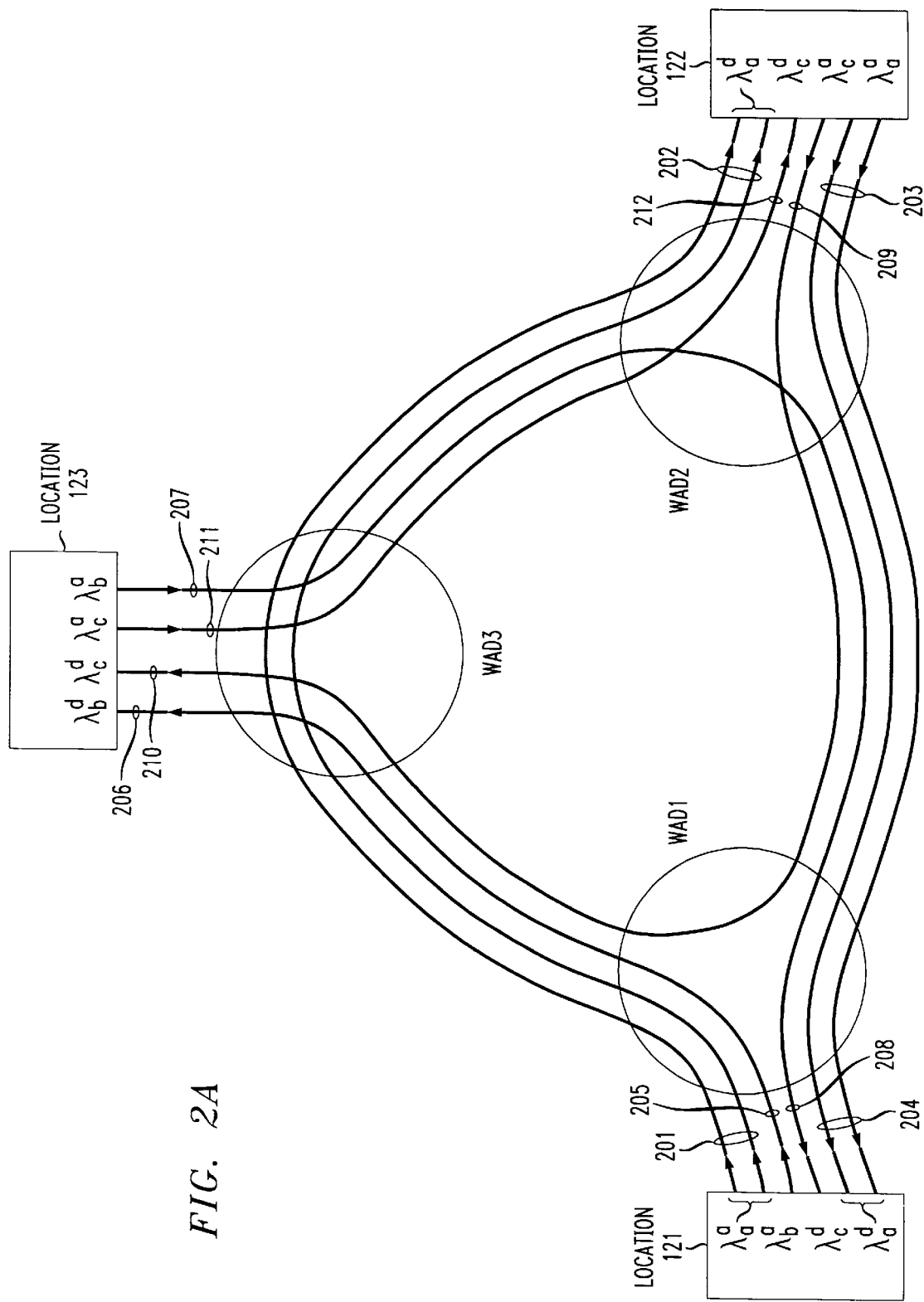
FIGS. 2a and 2b show a simplified diagram of the WDM ring network of FIG. 1 which shows the signal channels which are added and dropped at each WAD location, where each line represent 4 signal channels and the dashed line represents 2 channels.

With continued reference to FIG. 1, in one particular illustrative WDM network the three WAD sites, WAD1, WAD2, and WAD3, are connected by three spans 104–106 of optical fibers of lengths $L_1$=15.94, $L_2$=14.49, and $L_3$=11.13 km, respectively. With joint reference to FIGS. 1 and 2a, we also assume that sixteen WDM signal channels are propagated clockwise in the ring. Eight signal channels exist between WAD1 and WAD2, including 8 channels originating (201 of FIG. 2a) at location 121 of WAD1 and terminating (202 of FIG. 2a) at location 122 of WAD2 and 8 channels originating (203 of FIG. 2a) at location 122 of WAD2 and terminating (204 of FIG. 2a) at location 121 of WAD1. As shown each path in FIG. 2(a) represents 4 channels. Four channels exist between WAD2 and WAD3, including 4 channels originating (205 of FIG. 2a) at location 121 of WAD1 and terminating (206 of FIG. 2a) at location 123 of WAD3 and 4 channels originating (207 of FIG. 2a) at location 123 of WAD3 and terminating (208 of FIG. 2a) at location 121 of WAD1. Four channels also exist between WAD2 and WAD3, including 4 channels originating (209 of FIG. 2a) at location 122 of WAD2 and terminating (210 of FIG. 2a) at location 123 of WAD3 and 4 channels originating (211 of FIG. 2a) at location 123 of WAD3 and terminating (212 of FIG. 2a) at location 122 of WAD2. For illustrative purposes, the three groups of channels were represented with 3 lasers at the wavelengths of $\lambda_a$=1552.4 um, $\lambda_b$=1554.0 um, and $\lambda_c$=1556.1 um, respectively.

With reference to FIG. 1, at each WAD sites 101–103, all the received signal channels are amplified with an Erbium-Doped Fiber Amplifiers (EDFA) 111–113, respectively, before they either passed through or were dropped. In the following description the symbol $\lambda^a_b$ indicates a wavelength, where the subscript denotes the wavelength, e.g., b, and the superscript denotes whether that wavelength has been added "a" or dropped "d". For example, at WAD1 two gratings 161 and 162 at the added wavelengths $\lambda^a_a$, $\lambda^a_b$ and two gratings 163 and 164 at the dropped wavelengths $\lambda^d_a$, $\lambda^d_b$ are inserted between the two circulators 151 and 152. The wavelengths $\lambda^a_a$, $\lambda^a_b$ enter the input (I) port of circulator 152 from location 121 and are reflected by the gratings 161 and 162, respectively, and exit the output port of circulator 152 to optical fiber span 104.

In a similar manner, between the two circulators 153 and 154 of WAD2 are inserted two gratings to add the wavelengths $\lambda^a_a$, $\lambda^a_c$ and two gratings to drop the wavelengths $\lambda^d_a$, $\lambda^d_c$. Similarly, between the two circulators 155 and 156 of WAD3 are inserted two gratings are used to add the wavelengths $\lambda^a_c$, $\lambda^a_b$ and two gratings are used to drop the wavelengths $\lambda^d_b$, $\lambda^d_c$.

In a typical WDM ring network, where each of the signal channels are at a different wavelength, there would be a separate grating for each of the different wavelengths being added and a separate grating for each of the different wavelengths being dropped. Thus for our example, WAD1 would have 12 gratings for the 12 added wavelengths (8 from the group $\lambda^a_a$ and 4 from the group $\lambda^a_b$) and 12 grating for the 12 dropped wavelengths (8 from group $\lambda^d_a$ and 4 from group $\lambda^d_b$). Similarly, the total at WAD2 would also include 12 grating for the 12 added wavelengths ($\lambda^a_a$, $\lambda^a_c$) and 12 grating for the 12 dropped wavelengths($\lambda^d_a$, $\lambda^d_c$) The total at WAD3 would include 8 grating for the 8 added wavelengths($\lambda^a_c$, $\lambda^a_b$) and 8 grating for the 8 dropped wavelengths($\lambda^d_b$, $\lambda^d_c$). However it should be noted, with reference to WAD1, that if the same wavelength, e.g., $\lambda_a$, is to be dropped and then added at WAD1 (which is typical in an add/drop circuit), then one of the grating 162 or 164 can be eliminated since only one grating is needed at that dropped/added wavelength $\lambda_a$.

The WAD elements may be implemented using the type described in the article by C. Dragone, C. A. Edwards and R. C. Kisfier, "Integration Optics NXN Multiplexer on Silicon", IEEE Photonics Tech. Letters, vol.3, no.10, pp.896–899, October 1991, which is incorporated by reference herein. The WAD elements may also be of the type described in the copending patent application of C. R. Giles et al, entitled "ADD/DROP OPTICAL CIRCUIT FOR A WAVELENGTH-DIVISION MULTIPLEXED NETWORK", filed Oct. 15, 1996, Ser. No. 08/730,282, which is also incorporated by reference herein.

Each of the WAD1–WAD3 nodes may also include a variable attenuator e.g., 171 in WAD1, which is used to equalize the link loss to the link gain in each WAD link 101/104–103/106, to ensure that the input operating levels of each EDFA is the same. In an illustrative example, the total input and output power for each EDFA, 111–113, was −4 and 15 dBm, respectively. The gain of each EDFA, and therefore the loss between two adjacent EDFAs, was 19 dB. The gain tilt of EDFA in the signal wavelength region was small at this operating gain. A 10% coupler in WAD3, "M", was used to monitor the optical power in the ring, and the wavelength $\lambda_a$ was measured at the output port "0" of WAD1. In our example, if the added and dropped wavelengths are the same then only one grating may be used to both drop and add that wavelength, rather than using a separate drop grating and a separate add grating.

Figure 4:
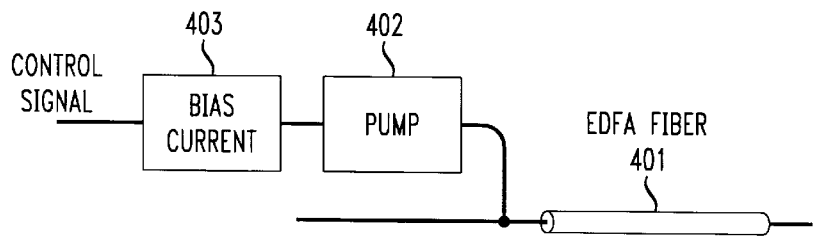
FIG. 4 illustrates a typical block diagram of a typical EDFA.

With reference to FIG. 4 there is shown a block diagram of a typical EDFA. The EDFA fiber 401 is supplied with a pump signal from optical pump 402. The power output of pump 402 is determined by the level of the bias current supplied from current source 403. A control signal controls the level of bias current from current source 403 and, hence, the gain in the EDFA fiber 401. The EDFA's may be of the type described in the article by R. G. Smart et al, entitled "Two-stage erbium-doped fibre amplifiers suitable for use in long-haul soliton systems", published in ELECTRONICS LETTERS, 6th January 1994, Vol. 30, No. 1, and incorporated by reference herein.

Figure 5:
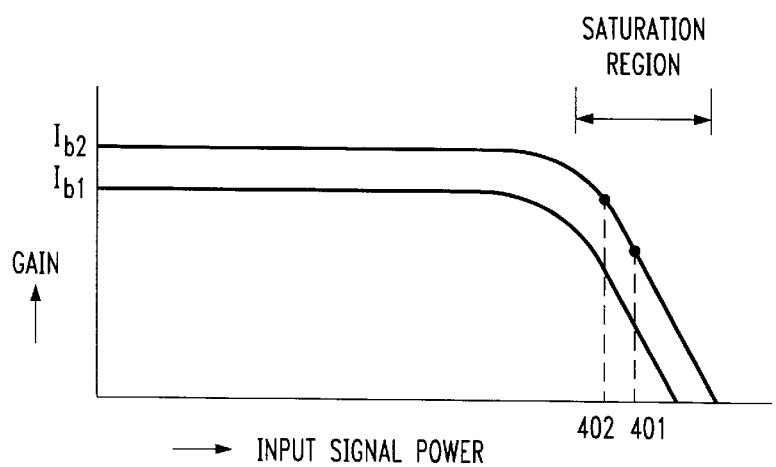
FIG. 5 illustrates an illustrative plot of gain versus input power for a typical EDFA of FIG. 4.

With reference to FIG. 5 there is shown an illustrative plot of gain versus input signal power for a typical EDFA fiber of FIG. 4. As shown, the gain level and saturation level varies as a function of both signal power and pump bias current. At higher pump bias current Ib2 both the gain and the saturation power level is higher than at the lower bias current Ib1.

To form the WDM ring network of FIG. 1, at each of the WAD links, 101/104–103/106, the gain of the EDFA at the signal wavelengths was set equal to the loss of for each of the WAD link, before the ring was closed. When the ring structure was closed, lasing appeared, as illustrated by the optical signals monitored at port "M", shown in FIG. 3(a). Such lasing occurs when one or more of the ASE wavelengths (e.g., 301 and 302) of an inactive portion of the transmission bandwidth, lies outside the reflection band of the fiber gratings. These ASE wavelengths traverse the entire WDN ring network and will lase if they experience a loop gain that barely exceeds the loop loss. Since the loop gain at the lasing wavelength is locked at the loop loss level (since lasing occurs when the net loop gain is 1, or 0 dB), the signal power at the output port "O", which measures wavelength $\lambda_a$, decreased by about 0.5 dB due to fact that the gain at the lasing wavelength is higher than that of the signal channel.

Figure 3A:
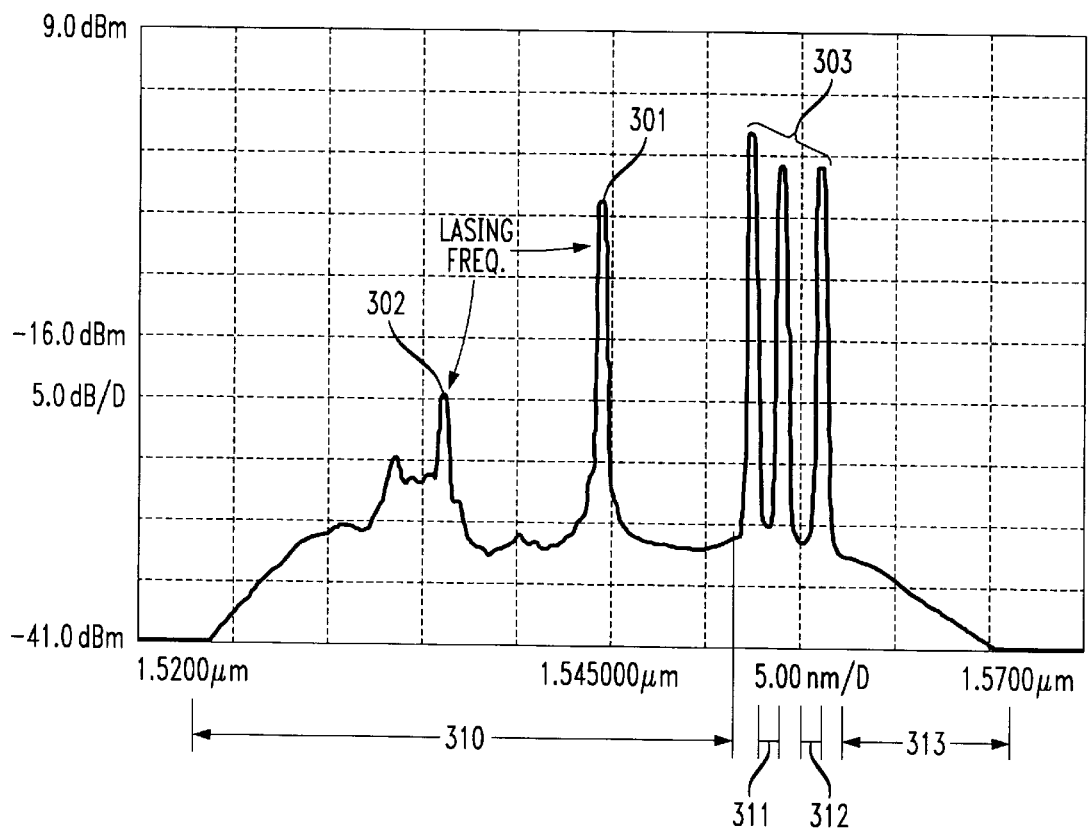
FIG. 3 (a) illustrates the spectrum of FIG. 2(a) where lasing appears at two wavelengths to the left of the three signal wavelengths when the WDM ring network in FIG. 1 is closed.
FIG. 3(b) shows that lasing is suppressed when each of the attenuators in the three WAD sites are increased by 1 dB.
FIG. 3(c) shows that lasing happens when $\lambda_a$ added to $WAD_1$ is cut, as compared to the normal operation shown in FIG. 3(b)
Figure 3B:
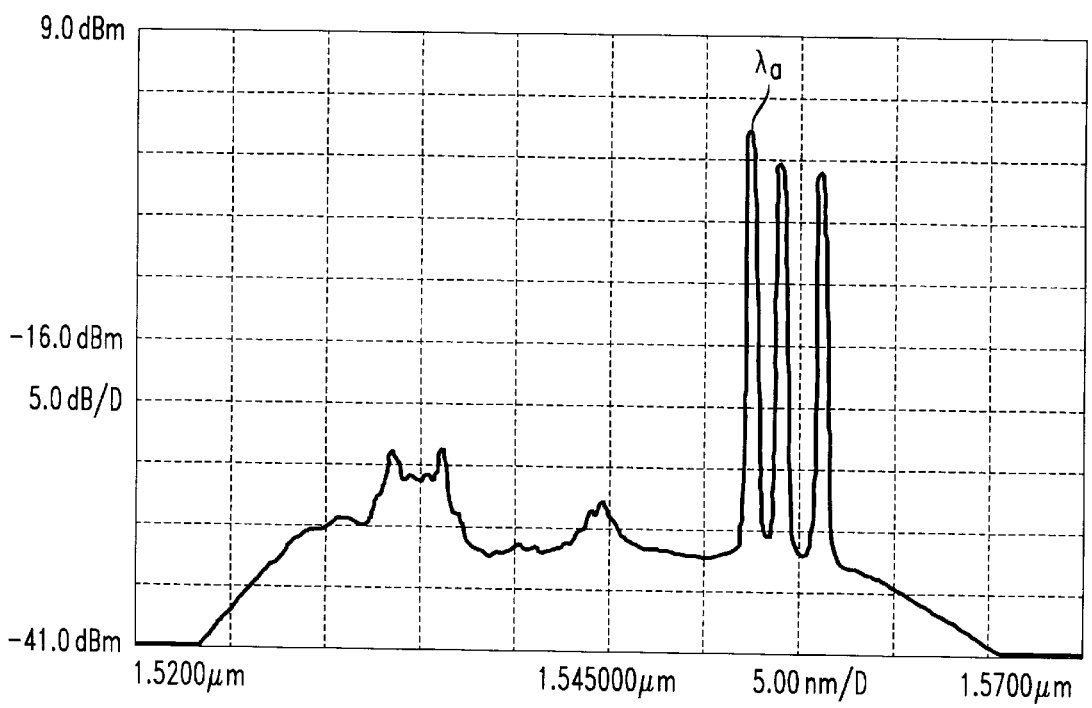

The laser power can be reduced and eliminated by increasing the cavity (i.e., loop) loss in the WDM ring network. In our example, the lasing threshold was reached when the attenuation was increased by about 0.7 dB at each WAD site, and complete lasing suppression was achieved when the attenuators were increased by 1.0 dB, as shown in FIG. 3(b). Since the EDFA's in the WAD sites were strongly saturated, the total output power was essentially constant and the signal power at monitor "M" increased by about 0.5 dB. However, the output power at the output port "O", not shown, decreased by about 1.6 dB due to a double pass through the attenuator 171 in WAD1.

Figure 3C:
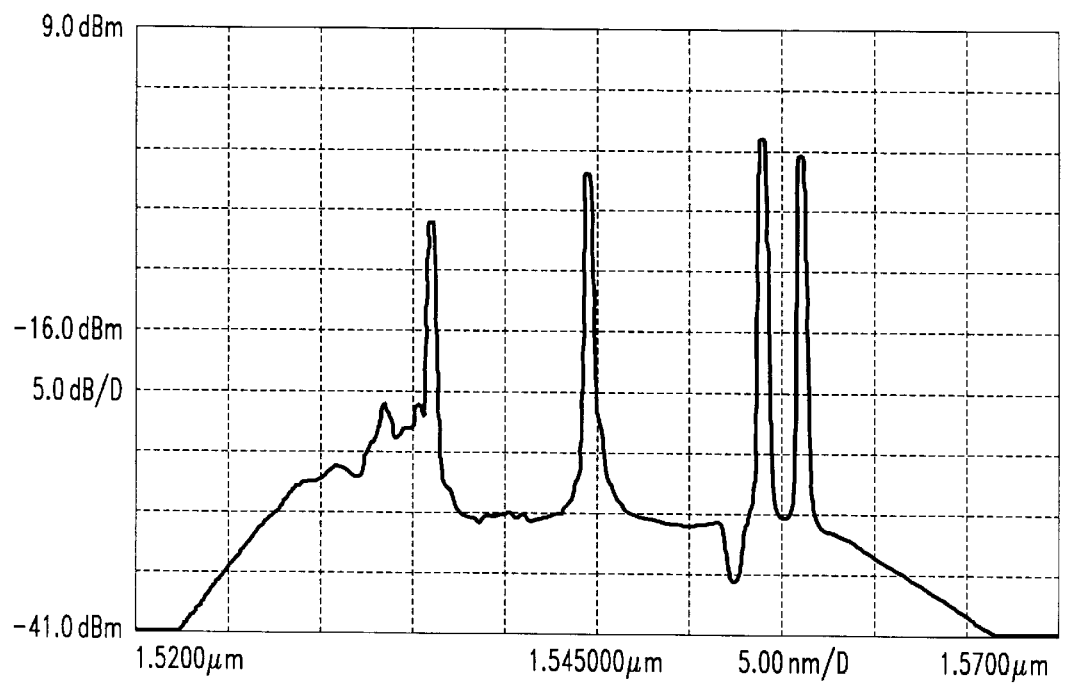

Since the WDM ring network of FIG. 1 was operating close to threshold, lasing could occur if the saturation level decreased and therefore the gain of the EDFA's increased. This can be seen in FIG. 4, where the gain of an EDFA, at a fixed bias current Ib2, is shown to increase as the input power level is reduced from its more saturated level 401 to the less saturated level 402. The reduction in power can happen in practice when some of the signal channels are dropped. Lasing can return when channel loading is changed in only part of the ring and all the signals in the ring are affected due to the cross-saturation of the EDFA caused by laser power. In the worst case, the signal power of some of the remaining channels can be reduced significantly and may reduce system power margins and cause false alarms in the system optical monitors. For example, as shown in FIG. 3(c), if the 8 channels of $\lambda_a$ added to WAD1 and dropped at WAD2 are discontinued, lasing started again. This is because the 8 channels no longer pass through EDFAs 113 and 112, and consequently, do not cross-saturate them. As a result, with reference to FIG. 4, the operating power levels of EDFAs 113 and 112 decreases from their more saturated levels, e.g., 401, to a less saturated level, e.g., 402. As shown in FIG. 4, the result of the reduced operating power levels from 401 to 402, is that the gain of both EDFAs 113 and 112 increases.

Since there is no change in the number of channel passing through EDFA 111 in WAD1, its power and hence gain would remain constant. If the increase in gain of both EDFAs 113 and 112 is enough to produce a net loop gain in the WDN ring network at the wavelengths 301 and/or 302, lasing at those wavelengths results. Note that the power of the resulting lasing signal would then further saturate and, hence, reduce the gain of all of the EDFAs 111,112, and 113 so as to return the loop gain to zero. Lasing however continues as long as the net loop gain is at least zero.

For our particular example WDN ring network of FIG. 1, the output power at port "O" decreased by 0.8 dB. If both channels to WAD1 are dropped, the output power decreased by 1 dB. While if both channels to WAD1 and WAD1 are lost, because of a fiber cut or because of a network reconfiguration, the output power decreased by 1.7 dB. Depending on the design of the structure and operating condition of the WDM network, these power variations may be tolerable.

It should be noted that depending on the gain flatness of the EDFA's and their operation condition, lasing may occur over a wide range of the ASE band. By changing saturation conditions, lasing may be observed at longer wavelength as compared to the signal wavelengths and even in between signal channels 303 of FIG. 3 (a). We have also determined that degradation of signal channels due to ASE lasing may be reduced by use of flat gain EDFA's and totally eliminated by increasing loop loss.

In certain cases, the problem can be so severe that the power of some signal channels may be greatly reduced, which will cause significant eye closure, when channel loading in part of the ring is changed even though there is no fault in the ring. In the worst case, the above problem can render transmission over the network useless.

Figure 2B:
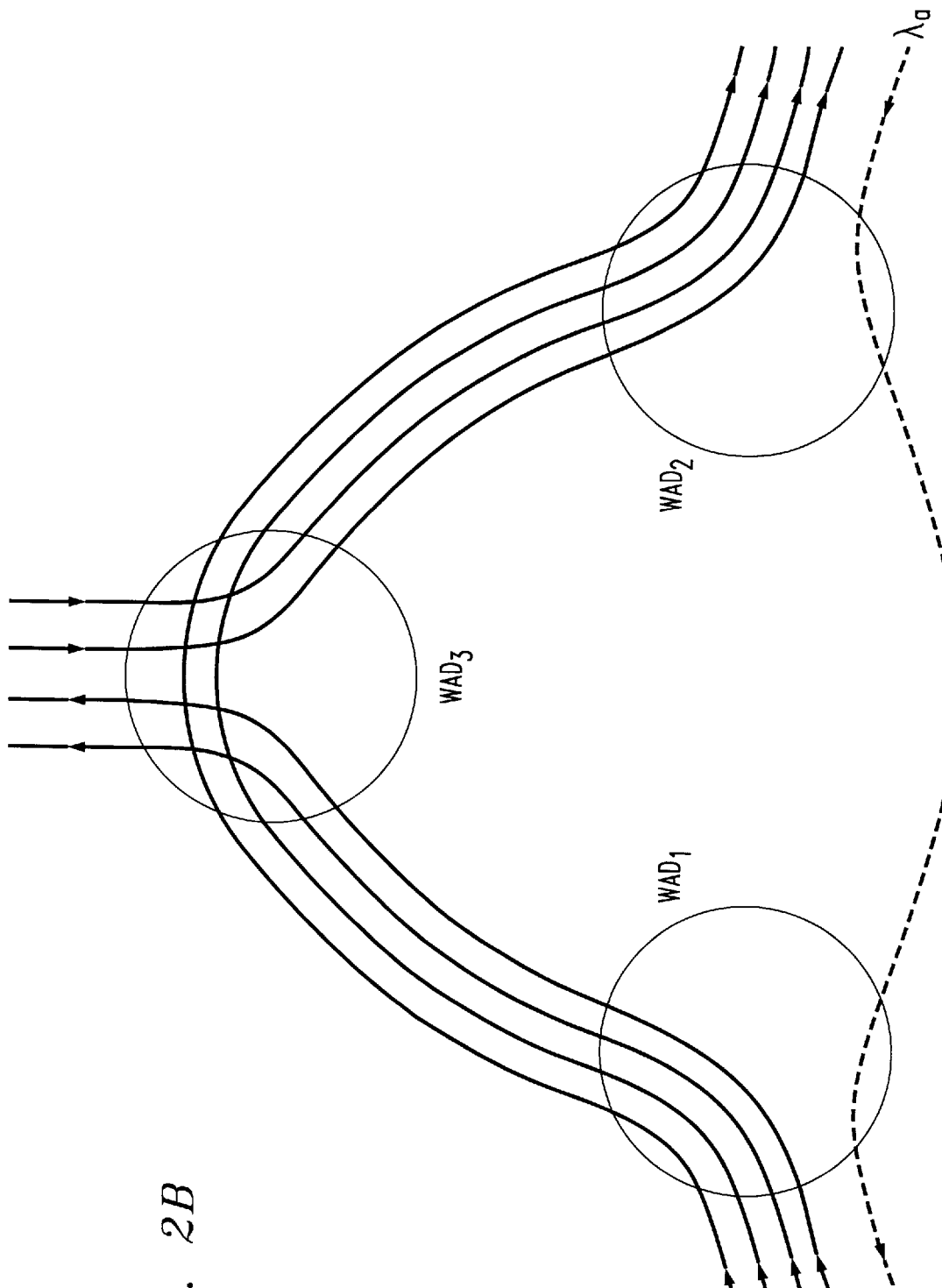

In another example, we modified the setup in FIG. 2 (a) to that shown in FIG. 2(b), so that 8 channels went from WAD1 to WAD2, 8 channels went from WAD1 to WAD3, 8 channels went from WAD3 to WAD2, and only 2 channels (shown by the dotted line) went from WAD2 to WAD1. The 2 channels at $\lambda_a$ from WAD2 to WAD1 also used the designed gain of 19 dB. When the wavelength $\lambda_a$ input to WAD1 was cut, the power at port "O" decreased by 2.9 dB. If all $\lambda_a$ inputs to WAD1 are cut, the power decreases by 5 dB; while if all inputs to WAD1 and WAD3 are cut, the power decreases by 6.2 dB. This will cause reduced system power margins and cause false alarms in the system optical monitors and hence would require the allocation of a great deal of additional system margin.

Figure 6:
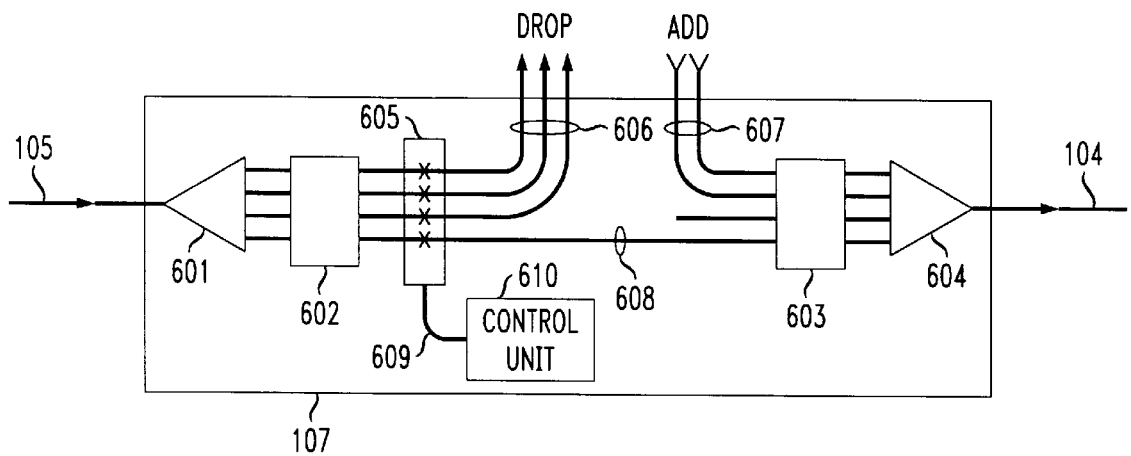
FIG. 6 illustrates a typical diagram of a Dragone router for use in a WAD site.

It should be noted that the power variation caused by lasing saturation is not limited to WAD sites using gratings. Closed paths can also be formed in certain WDM ring network architectures that utilize demux/mux WAD. Shown in FIG. 6 is an illustrative demux/mux WAD implemented using a well known Dragone Waveguide Grating Router. Such a WGR is described in the previously-referenced article by C. Dragone et al. enables the routing of signal channels according to their wavelength.

As shown in FIG. 6 a WAD node (e.g., WAD1) may be implemented using a WGR 107 including a demultiplexer WGR unit 601, waveguide interfaces 602 and 603, and a multiplexer WGR 604. The function of the switch unit 605 will be described in a later paragraph.

The demultiplexer WGR unit 601 is used to separate the various wavelength signal channels received over an optical fiber (e.g., span 105). The channel outputs of WGR unit 601 connect to interface 602. FIG. 6 illustrates how the WGR 107 may be used to add and drop wavelengths in our FIG. 2 example. As shown 4 wavelength paths enters WGR 107 with 3 wavelength paths being dropped 606 and 3 wavelength paths being added. Again, as before, each line represents 4 channels. Of the 4 output wavelength paths from switch interface 605, 3 wavelength paths 606 are dropped and wavelength paths 608 is connected through to interface 603 along with the added 3 wavelength paths 607. The output of interface 603 connects to multiplexer WGR 604 which combines the signal channels for transmission over span 104.

It should be noted that while the selectivity of demultiplexer WGR unit 601 and the multiplexer WGR 604 are relatively narrowband devices, it is still possible for lasing to occur in a WDM ring network formed of such WGR nodes. In accordance with the present invention, to protect against lasing the wavelength path, e.g., 608, is opened thereby preventing a continuous loop in the WDM ring network from being formed at that wavelength. As shown, switch unit 605 includes one or more switch networks, for switchably connecting/disconnecting inactive wavelength channels in the WDM ring network. The switch unit 605 operates in response to a control signal 609 generated by a local control unit 610 which senses when wavelengths have been added or deleted from the WAD node 107. Control unit 610 includes node link control algorithms which use wavelength allocation in the network to control the wavelength switching in interface 605. Such link control is described in the article by J. Zyskind et al, "Fast Link Control Protection for Surviving Channels in Multiwavelength Optical Networks", Proc. ECOC 96, Vol. 5, page 49, which is incorporated by reference herein.

With reference to FIG. 1, another technique for protecting against lasing in WDM ring networks is described. A protection means may be included in the WDM ring network to change the optical transmission characteristics of a selected portion of the operating wavelength bandwidth of the WDM ring network. When the WDM network includes WAD node elements that utilize fiber gratings and circulators, notch filters 181 may be used as the protection means. With reference to FIG. 3(a), the stop bands of the notch filters 181 would block the ASE between the reflection band of add/drop gratings, i.e., bands 310–313. The loss of the notch filters 181 ensure that the loop gain at all the frequencies in bands 310–313 is substantially less than 0 dB. Note the notch filters 181 can also include a notch filter for each of the signal channels 303 to protect against lasing at those wavelengths, when they are not in use. Additionally, it should be noted that notch filters 181 may be made selective under control of control signal 182, so that particular notch filters may be switched into the network by a local controller which senses when wavelengths have been added or deleted from the WAD node.

Another technique for suppressing lasing in a WDM ring network is to control the gain of all the EDFA's in the ring during change in channel loading, so that round trip (loop) gain is always less than the loop loss. One technique for controlling the gain of an EDFA is shown in FIG. 4, where a control signal from a controller, not shown, signals when the gain should be changed in response to wavelengths which have been added or deleted from its WAD node. Such a technique is described in the article by A. Srivastava et al, "Fast Pump Control in an Erbium Doped Fiber Amplifier" post deadline paper PDP4, OAA'97, and incorporated by reference herein.

Figure 7:
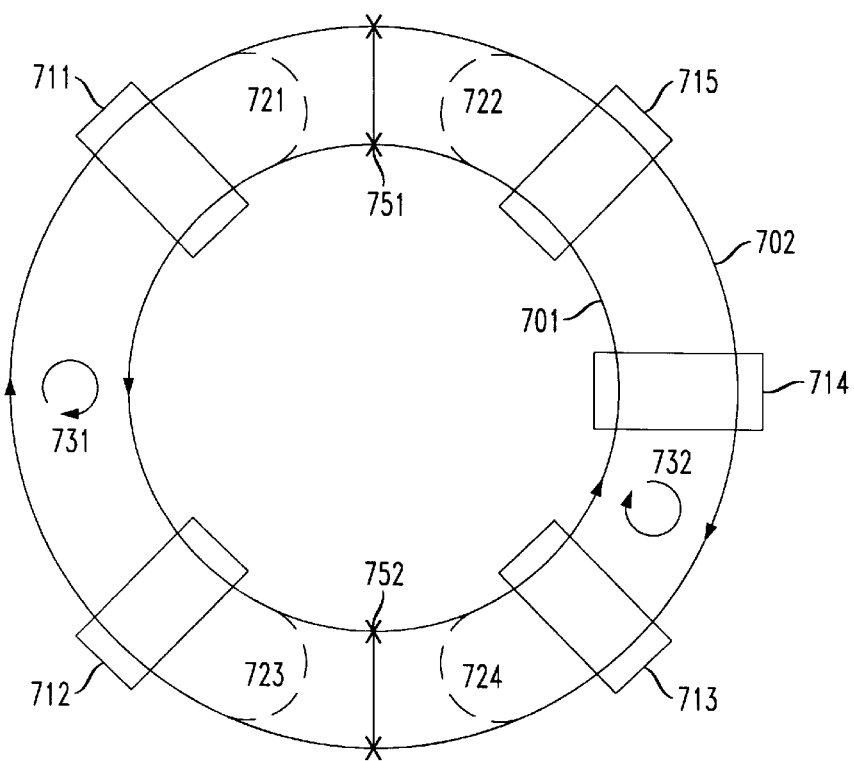
FIG. 7 shows how the techniques of the present invention may be utilized in an illustrative double WDM ring network.

FIG. 7 shows how the techniques of the present invention may be utilized in an illustrative double WDM ring network. As shown the double WDM ring network includes rings 701 and 702 including WAD sites 711–715. It should also be noted that one or more of the WAD sites 711–715 may be well-known optical cross-connects which enable wavelengths to be routed to and/or from other optical networks. In the same manner as previously described, the WAD sites 711–715 incorporate protection means to prevent lasing in the rings 701 and 702 when any signal wavelengths are added or dropped at any of the WAD sites 711–715. In the event that a break or cut, e.g., 751 and 752, occurs in the fiber of ring 701 and 702, well known patch networks 721–724 can be automatically switched-in to form new WDM ring networks loops 731 and 732. In accordance with the present invention, the protection means located at WAD sites 711–715 may be controllable so as to be automatically switched in or out of the new WDM ring networks loops 731 and 732 to prevent lasing in the new WDM ring networks.

Additionally as previously described, and in accordance with the present invention, the gain of the EDFA fiber may also be changed to ensure that no lasing in the new WDM ring networks. This may be accomplished using pump control, as discussed in the previously-referenced article by A. Srivastava et al, and using link control, as described in the previously-referenced article by J. Zyskind et al.

What has been described is merely illustrative of the application of the principles of the present invention. Other arrangements and methods can be implemented by those skilled in the art without departing from the spirit and scope of the present invention.

We claim:

1. A Wavelength Division Multiplexed (WDM) ring network comprising a plurality of serially connected node links, each node link including a segment of optical fiber and an access node site for adding or dropping one or more active wavelength channels to a transmission bandwidth of the network, protection means, connected to the network, for changing the optical transmission characteristics of the network to ensure that the network loop gain at any wavelength does not exceed the network loop loss, wherein the protection means affects light in an unused portion of the transmission bandwidth to ensure that the network loop gain for that unused portion is less than the network loop loss.

2. The WDM ring network of claim 1 wherein the protection means includes gain control to manage the network loop gain at one or more wavelengths.

3. The WDM ring network of claim 1 wherein the unused portion of the transmission bandwidth includes one or more unused wavelength channels which are not in use by the network.

4. The WDM ring network of claim 1 wherein the protection means prevents lasing at Amplified Spontaneous Emissions (ASE) lasing in the unused portion of the transmission bandwidth.

5. The WDM ring network of claim 1 wherein at least one of the plurality of connected node means includes one or more optical circuits selected from a group including at least an Add/Drop circuit and a cross-connect circuit.

6. The WDM ring network of claim 1 wherein at least one of the plurality of connected node means includes means for routing wavelength channels according to their wavelength.

7. The WDM ring network of claim 6 wherein the protection means includes one or more switch elements, each switch element for controlling the connection of an unused wavelength channel of the routing means.

8. The WDM ring network of claim 7 wherein the one or more switch elements are responsive to control signals for controlling the switchable connections.

9. A Wavelength Division Multiplexed (WDM) ring network comprising a plurality of serially connected node links, each node link including a segment of optical fiber and an access node site for adding or dropping one or more active wavelength channels to a transmission bandwidth of the network, protection means, connected to the network, for changing the optical transmission characteristics of the network to ensure that the network loop gain at any wavelength does not exceed the network loop loss, wherein the protection means utilizes access node control algorithms to control the network loop gain at one or more wavelengths.

10. A Wavelength Division Multiplexed (WDM) ring network comprising a plurality of serially connected node links, each node link including a segment of optical fiber and an access node site for adding or dropping one or more active wavelength channels to a transmission bandwidth of the network, protection means, connected to the network, for changing the optical transmission characteristics of the network to ensure that the network loop gain at any wavelength does not exceed the network loop loss, wherein the protection means includes one or more notch filters.

11. The WDM ring network of claim 10 wherein each of the one or more notch filters reduces the optical transmission of a part of the unused portion of the transmission bandwidth.

12. A Wavelength Division Multiplexed (WDM) ring network comprising a plurality of serially connected node links, each node link including a segment of optical fiber and an access node site for adding or dropping one or more active wavelength channels to a transmission bandwidth of the network, protection means, connected to the network, for changing the optical transmission characteristics of the network to ensure that the network loop gain at any wavelength does not exceed the network loop loss, wherein each node link includes its own protection means.

13. A method of stabilizing optical transmission in a Wavelength Division Multiplex (WDM) ring network comprising the steps of adding or dropping one or more active wavelength channels to a transmission bandwidth of the network, and changing, in response to the adding or dropping step, an optical transmission characteristics of the network to ensure that the network loop gain at any wavelength is always less than the network loop loss, wherein the changing step changes the optical transmission of an unused portion of the transmission bandwidth of the network.

14. The method of claim 13 wherein the changing step reduces the optical transmission of an unused portion of the transmission bandwidth when one or more active wavelength channels are dropped.

* * * * *

UNITED STATES PATENT AND TRADEMARK OFFICE
CERTIFICATE OF CORRECTION

PATENT NO. : 6,025,941
DATED : February 15, 2000
INVENTOR(S) : Atul Kumar Srivastava, James W. Sulhoff, Yan Sun John Lehrer Zyskind It is certified that error appears in the above-identified patent and that said Letters Patent is hereby corrected as shown below:

<u>Column 1,</u>
Line 2, after the title insert --
ACKNOWLEDGEMENT OF GOVERNMENTAL RIGHTS --

This invention was made with Government support under Agreement No. MDA 972-94-0036 awarded by ARPA. The Government has certain rights in the invention.

Signed and Sealed this

Fourth Day of December, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,025,941                                    Page 1 of 1
DATED      : February 15, 2000
INVENTOR(S): Atul Kumar Srivastava, James W. Sulhoff, Yan Sun, John Lehrer Zyskind It is certified that error appears in the above-identified patent and that said Letters Patent is hereby corrected as shown below:

Column 1,
Line 2, after the Title insert
-- ACKNOWLEDGEMENT OF GOVERNMENTAL RIGHTS This invention was made with Government support under Agreement No. MDA 972-94-0036 awarded by ARPA. The Government has certain rights in the invention. --

Signed and Sealed this

Twenty-second Day of January, 2002

Attest:

JAMES E. ROGAN
*Attesting Officer*     *Director of the United States Patent and Trademark Office*